United States Patent
Vogel et al.

(10) Patent No.: US 6,729,868 B1
(45) Date of Patent: May 4, 2004

(54) DEVICE FOR BLOW MOULDING CONTAINERS

(76) Inventors: Klaus Vogel, Ruetersbarg 4a, D-22885 Barsbuttel (DE); Michael Linke, Scheunenkoppel 12, D-22926 Ahrensburg (DE)

(*) Notice: Subject to any disclaimer, the term of this patent is extended or adjusted under 35 U.S.C. 154(b) by 0 days.

(21) Appl. No.: 10/019,149

(22) PCT Filed: Mar. 27, 2000

(86) PCT No.: PCT/DE00/00948
§ 371 (c)(1),
(2), (4) Date: May 24, 2002

(87) PCT Pub. No.: WO01/00387
PCT Pub. Date: Jan. 4, 2001

(30) Foreign Application Priority Data
Jun. 25, 1999 (DE) ......................... 199 29 033

(51) Int. Cl.$^7$ ............................... B29C 49/56
(52) U.S. Cl. .................... 425/195; 425/405.1; 425/522; 425/541
(58) Field of Search ................ 425/195, 522, 425/540, 541, 405.1

(56) References Cited

U.S. PATENT DOCUMENTS

| | | | |
|---|---|---|---|
| 3,829,264 A | 8/1974 | Mnilk et al. ................ 425/541 |
| 4,786,245 A | * 11/1988 | Windstrup et al. ........... 425/541 |
| 5,064,366 A | 11/1991 | Voss ....................... 425/541 |
| 5,411,391 A | * 5/1995 | Albrecht et al. ............ 425/541 |
| 5,486,103 A | * 1/1996 | Meiring et al. ............. 425/541 |
| 5,968,560 A | * 10/1999 | Briere et al. ............... 425/195 |
| 6,099,286 A | * 8/2000 | Nitsche ................... 425/405.1 |
| 6,444,160 B1 | * 9/2002 | Bartoli ..................... 425/541 |

FOREIGN PATENT DOCUMENTS

| | | | | |
|---|---|---|---|---|
| DE | 1 911 600 | 9/1970 | | |
| DE | 23 52 926 | 4/1975 | | |
| DE | 42 12 583 A1 | 10/1993 | | |
| DE | 42 12 584 A1 | 10/1993 | | |
| DE | 43 40 291 A1 | 6/1995 | | |
| DE | 198 10 238 A1 | 5/1999 | | |
| FR | 2 659 265 | 9/1991 | | |
| FR | 2813231 A1 | * 3/2002 | ........... B29C/49/56 |
| WO | WO 98/13191 | 4/1998 | | |
| WO | WO0053395 A1 | * 9/2000 | ........... B29C/49/56 |

* cited by examiner

*Primary Examiner*—Robert B. Davis
(74) *Attorney, Agent, or Firm*—Harness, Dickey & Pierce, P.L.C.

(57) ABSTRACT

The device is used for blow molding containers of a thermoplastic material and has at least one blow station with at least one blow mold. The blow mold is comprised of at least two blow mold segments held by supports. At least one of the blow mold segments is arranged such that it can slide relative to its support. The support is equipped with at least two guide elements for the movable blow mold segment. The guide element has a hard core that is connected to the blow mold segment. In addition, the core is embedded, at least in part, in an elastomer that is carried by the support. A circumferential seal made of an elastomer is provided in order to make available an area of pressure action in order to support pneumatic positioning of the blow mold segment; this seal has a seal lip that makes area contact with the support when pressure is applied.

20 Claims, 8 Drawing Sheets

DEVICE FOR BLOW MOULDING CONTAINERS

BACKGROUND AND SUMMARY OF THE INVENTION

The invention relates to a device for blow moulding containers of a thermoplastic material that has at least one blow station with at least one blow mould that is comprised of at least two blow mould segments held by supports and wherein at least one of the blow mould segments is arranged such that it can slide relative to its support.

In this type of container moulding using blow pressure action, preforms of a thermoplastic material, for example preforms of PET (polyethylene terephthalate), are delivered to different processing stations within a blow moulding machine. Typically, such a blow moulding machine has a heater unit and a blow unit in which the previously temperature treated preform is expanded by biaxial orientation to a container. The expansion is accomplished with the use of compressed air, which is introduced into the preform to be expanded. The process sequence of such an expansion is explained in DE-OS 43 40 291.

The basic structure of a blow station for moulding containers is described in DE-OS 42 12 583. Options for temperature treatment of the preforms are explained in DE-OS 23 52 926.

Within the device for blow moulding, the preforms and the blow-moulded containers can be transported by means of various handling devices. One proven technique in particular is the use of transport mandrels onto which the preforms are placed. The preforms can also be handled with other carrying devices, however. For example, the use of grippers for handling preforms, and the use of expansion mandrels that can be introduced into a mouth area of the preform are also among the available designs.

The aforementioned handling of the preforms takes place on the one hand as part of the so-called two-stage process, in which the preforms are first manufactured in an injection moulding process, then are stored temporarily, before later being conditioned with respect to their temperature and blow moulded into containers. On the other hand, application is also found in the so-called one-stage process, in which the preforms are appropriately temperature treated and then blow moulded immediately after their production by injection moulding and adequate hardening.

As regards the blow stations employed, various different embodiments are known. In blow stations that are arranged on rotating transport wheels, one frequently encounters mould supports that swing open in a book-like fashion. However, it is also possible to use mould supports that slide relative to one another or operate in other ways. In stationary blow stations, which are especially suitable for accommodating multiple cavities for container moulding, plates that typically are arranged parallel to one another are used as moulds.

Typically, devices for processing thermoplastics use moulds that must be suitably temperature treated to ensure short process cycles. Often, it is not only temperature treatment to a predetermined temperature level that is performed; instead the mould is first heated as a function of the relevant process steps and is cooled after insertion or moulding of the thermoplastic is completed in order to attain dimensional stability of the plastic item as quickly as possible.

Oils or water are typically used as temperature control media. These liquid temperature control media flow through the parts requiring temperature treatment in the area of coolant channels. Heat transfer is accomplished through contact of the temperature control medium with the wall of the coolant channel. The efficiency of the heat transfer in each case is dependent upon the temperature difference between the temperature of the channel wall and the temperature of the temperature control medium in a vicinity of the wall.

During design of the blow stations, different requirements must be met, where each optimization made with respect to only a single requirement can be expected to have negative effects with regard to the other requirements. On the one hand, for example, the lowest possible structural weight is desired, but on the other hand adequate structural strength must be provided on account of the exposure to high internal pressure. Likewise, it is necessary to ensure that the mould parts are pressed together sufficiently strongly despite the internal pressure action so as to avoid formation of a gap that would result in a discernible seam in the exterior region of the blow-moulded containers.

Consequently, the object of the present invention is to design a device of the aforementioned type that has a low structural weight while achieving convenient guiding of the blow mould segment that can slide relative to its support.

This object is attained in accordance with the invention in that the support is equipped with at least two guide elements for the movable blow mould segment and in that the guide segment has a hard core that is connected to the blow mould segment and that is embedded, at least in part, in an elastomer that is carried by the support.

Another object of the present invention is to design a seal such that a strong sealing effect is achieved, in order to bolster pneumatic bracing of the movable blow mould segment relative to its support.

This object is attained in accordance with the invention in that the blow mould segment is sealed by a circumferential elastomer seal with respect to the support in an area of action provided for the application of pneumatic pressure, and in that the seal has a seal lip that makes area contact with the support when pressure is applied.

Due to the use of a guide element with a hard core that is embedded in an elastomer, it is possible to support the blow mould segment in a manner similar to the use of a stud guide and simultaneously to use the flexible properties of the elastomer to compensate for manufacturing tolerances. In addition, in the event of a deflection of the blow mould segment, the elastomer provides restoring forces that cause an elastic return to the initial position once application of the pneumatic pressure stops.

The design of the seal with a seal lip that makes area contact with the support provides a very strong sealing effect, thus avoiding loss of pressure. As compared to seals in the form of O-rings, which provide a merely linear contact surface, the use of the area contact seal lip provides a greatly increased sealing effect, and thus offers significantly superior efficiency.

A direct connection between the core and the blow mould segment can be accomplished in that sections of the core protrude out of the elastomer.

The use of universal components can be supported in that the core is connected to the blow mould segment by a coupling element.

A compact configuration is supported in that the combination of the core and the elastomer is designed in the manner of a sleeve.

To achieve economical manufacture of the necessary recesses for holding the components, it is proposed that the elastomer surrounds the core with a rounded shape.

The number of components used can be reduced in that the core is directly connected to one mould part.

In order to support manufacture of product-specific mould parts that are light in weight and are easily interchangeable, it is proposed that the core is connected to an intermediate shell that supports the mould part.

Delivery of preforms and discharge of blow-moulded containers is facilitated in that the supports are hinge-jointed to one another.

An easily implemented preloading can be achieved in that provision is made for the application of pressure to determine positioning of the movable blow mould segment.

To ensure that the mould parts abut one another even when internal pressure is applied during container moulding, it is proposed that one of the mould parts can be pneumatically braced with respect to the other mould part.

To accomplish a high degree of efficiency in generating preloading, it is proposed that at least one of the mould parts is held in place so as to be sealed with respect to the support.

Further simplification of the configuration can be accomplished in that, in order to provide a preloading force, provision is made for an area of pressure action that is delimited by a circumferential seal.

To ensure a high-quality pressure seal with minimal device complexity, provision is made for the guide elements to be arranged outside the area of pressure action.

Large-area contact of the seal lip during the application of pressure is supported in that the seal lip has a base block that is connected by a tapered part to a seal lip, sections of which lip extend a distance from a base projection of the base block and, in combination with the base projection, delimits a seal notch.

In particular, in order to achieve intended deformation of the seal, it is useful for the seal notch to be arranged to face an area of pressure action.

BRIEF DESCRIPTION OF THE DRAWINGS

Exemplary embodiments of the invention are represented schematically in the drawings in which.

DESCRIPTION OF THE PREFERRED EMBODIMENTS

Figure 1:
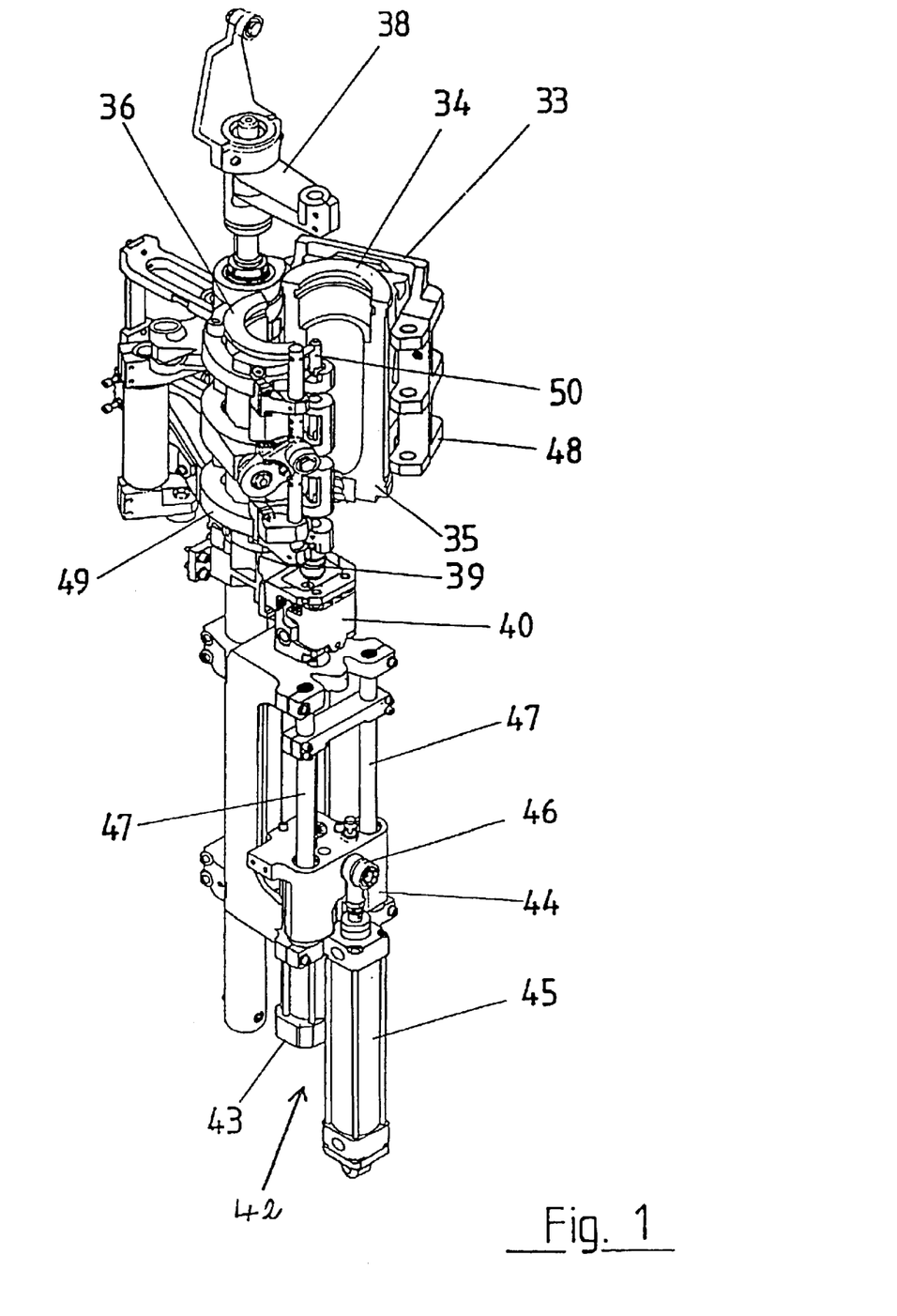
FIG. 1 is a perspective view of a blow station for manufacturing containers from preforms.
Figure 2:
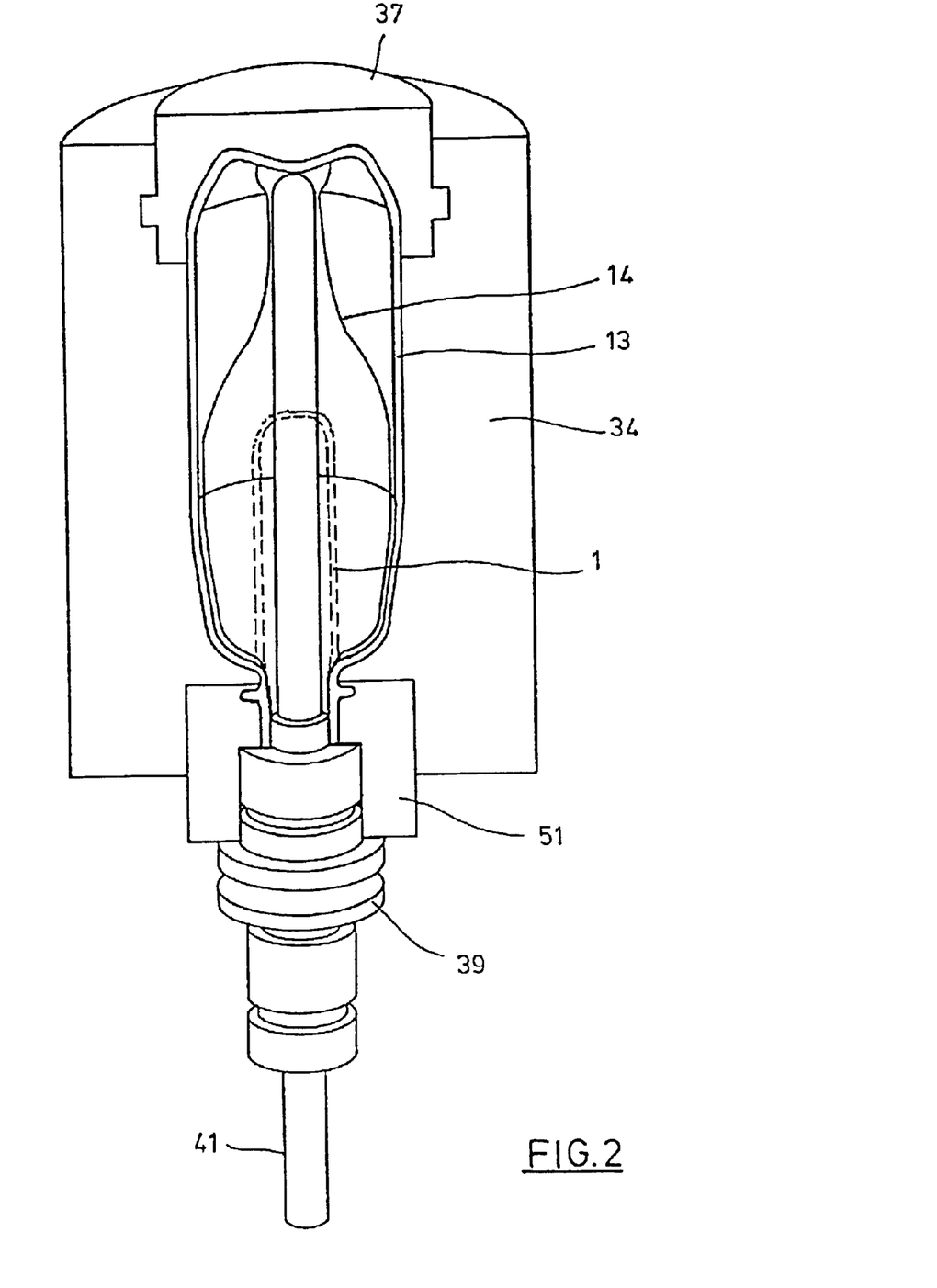
FIG. 2 is a longitudinal section through a blow mould in which a preform is stretched and expanded.

The basic structure of a device for blow moulding the preforms (1) into containers (13) is shown in FIG. 1 and FIG. 2.

The device for forming the container (13) consists essentially of a blow station (33), which is equipped with a blow mould (34) into which can be inserted a preform (1). The preform (1) can be an injection-moulded part of polyethylene terephthalate. To permit insertion of the preform (1) in the blow mould (34) and to permit removal of the finished container, the blow mould (34) is composed of mould parts (35, 36) and a bottom piece (37) that can be positioned by a lifting apparatus (38). The preform (1) can be held in the area of the blow station (33) by a transport mandrel (39), which passes through a plurality of treatment stations within the device along with the preform (1). However, it is also possible to insert the preform (1) directly in the blow mould (34) through the use of grippers, for example, or other handling means.

To permit the delivery of compressed air, a connecting flask (40) is arranged beneath the transport mandrel (39); this flask supplies compressed air to the preform (1) and simultaneously provides sealing relative to the transport mandrel (39). In a modified design, it is also possible to use fixed compressed air lines, of course.

Stretching of the preform (1) is accomplished with the aid of a stretching rod (41), which is positioned by a cylinder (42). However, it is also possible to accomplish mechanical positioning of the stretching rod (41) by means of cam segments acted upon by follower rollers. The use of cam segments is particularly useful when a plurality of blow stations (33) are arranged on a rotating blow wheel. Use of cylinders (42) is useful when stationary blow stations (33) are provided.

In the embodiment shown in FIG. 1, the stretching system is designed such that a tandem arrangement of two cylinders (42) is provided. Before the start of the actual stretching process, the stretching rod (41) is first moved by a primary cylinder (43) into the region of the bottom (7) of the preform (1). During the actual stretching process, the primary cylinder (43) with extended stretching rod is positioned, together with a carriage (44) bearing the primary cylinder (43), by a secondary cylinder (45) or via a cam control. In particular, the intent is to use cam control of the secondary cylinder (45) in such a way that a current stretching position is given by a guide roll (46), which slides along a curved path during the stretching process. The guide roll (46) is pressed against the guide path by the secondary cylinder (45). The carriage (44) slides along two guide elements (47).

After the mould parts (35, 36) in the vicinity of supports (48, 49) have closed, the supports (48) lock relative to one another by means of a locking device (50).

In order to adjust to various shapes of the mouth section (2), provision is made to use separate thread inserts (51) in the area of the blow mould (34), as shown in FIG. 2.

In addition to the blow-moulded container (13), FIG. 2 also shows the preform (1), indicated by dashed lines, and a developing container bubble (14) in schematic form.

Figure 3:
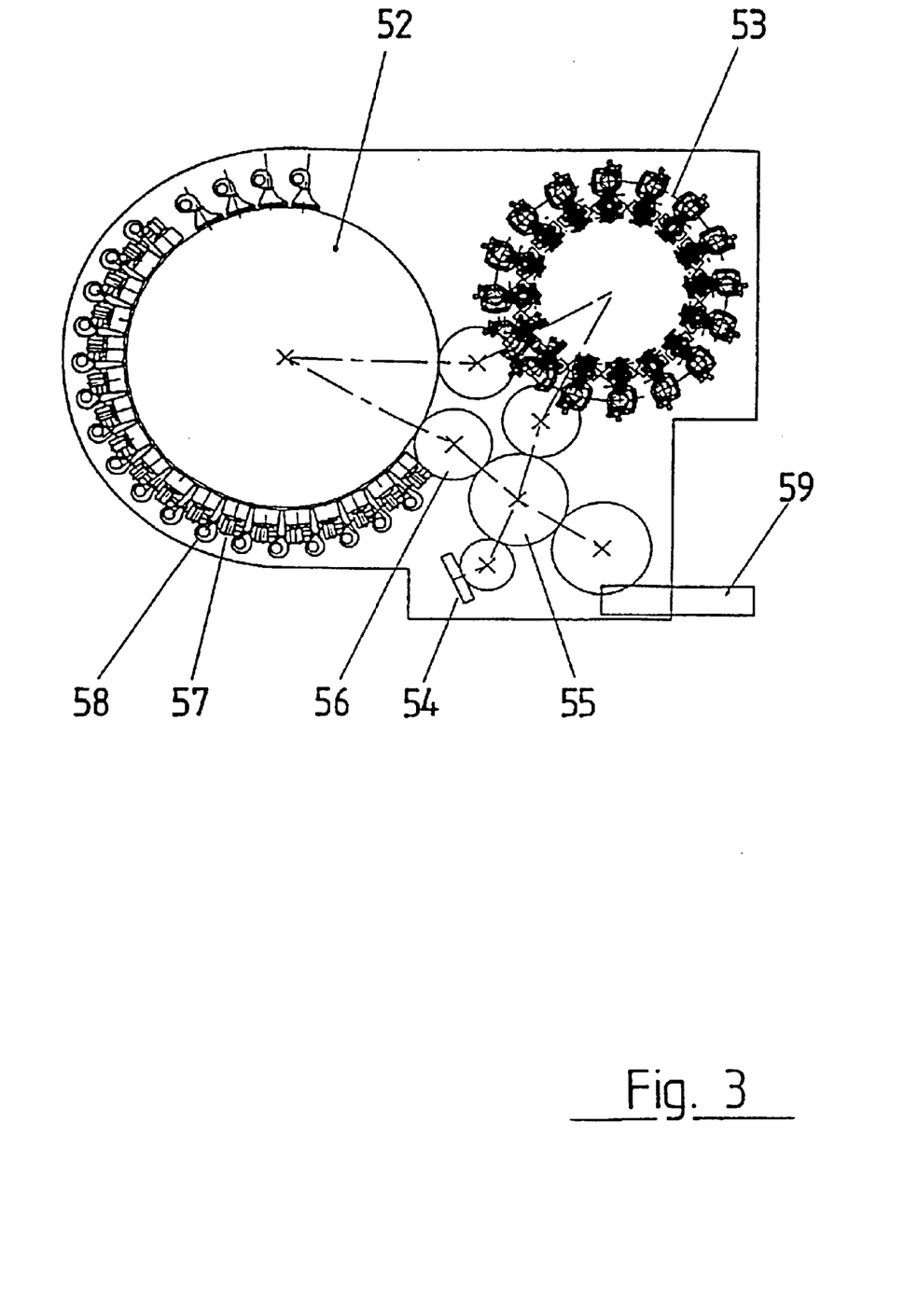
FIG. 3 is a schematic plan view illustrating a basic structure of a device for blow moulding of containers.

FIG. 3 shows the basic structure of a blow moulding machine that is equipped with a rotating heat wheel (52) as well as a rotating blow wheel (53). Starting at a preform inlet (54), the preforms (1) are transported by transfer wheels (55, 56) into the area of the heat wheel (52). Arranged along the heat wheel (52) are radiant heaters (57) and fans (58) for temperature treatment of the preforms (1). After sufficient temperature treatment of the preforms (1), they are transferred to the flow wheel 53; the blow stations (33) are arranged near the latter. The finished, blow moulded containers (13) are delivered to an output section (59) by additional transfer wheels.

To be able to mould a preform (1) into a container (13) in such a way that the container (13) has material properties that ensure a long shelf life of foods, more particularly beverages, placed in the container (13), special process steps must be followed during the heating and orientation of the preforms (1). Moreover, beneficial effects can be achieved by adhering to special dimensioning guidelines.

A variety of plastics can be used as the thermoplastic material. Examples of plastics that may be used include PET, PEN and polypropylene.

Expansion of the preforms (1) during the orientation process is accomplished through the delivery of compressed air. The delivery of compressed air is divided into a preblow phase, in which gas, for example compressed air, is delivered at a low pressure level, and a subsequent primary blow phase, in which gas is delivered at a higher pressure level. Typically, compressed air at a pressure in the range from 10 bar to 25 bar is used during the preblow phase, and compressed air at a pressure in the range from 25 bar to 40 bar is used during the primary blow phase.

Figure 4:
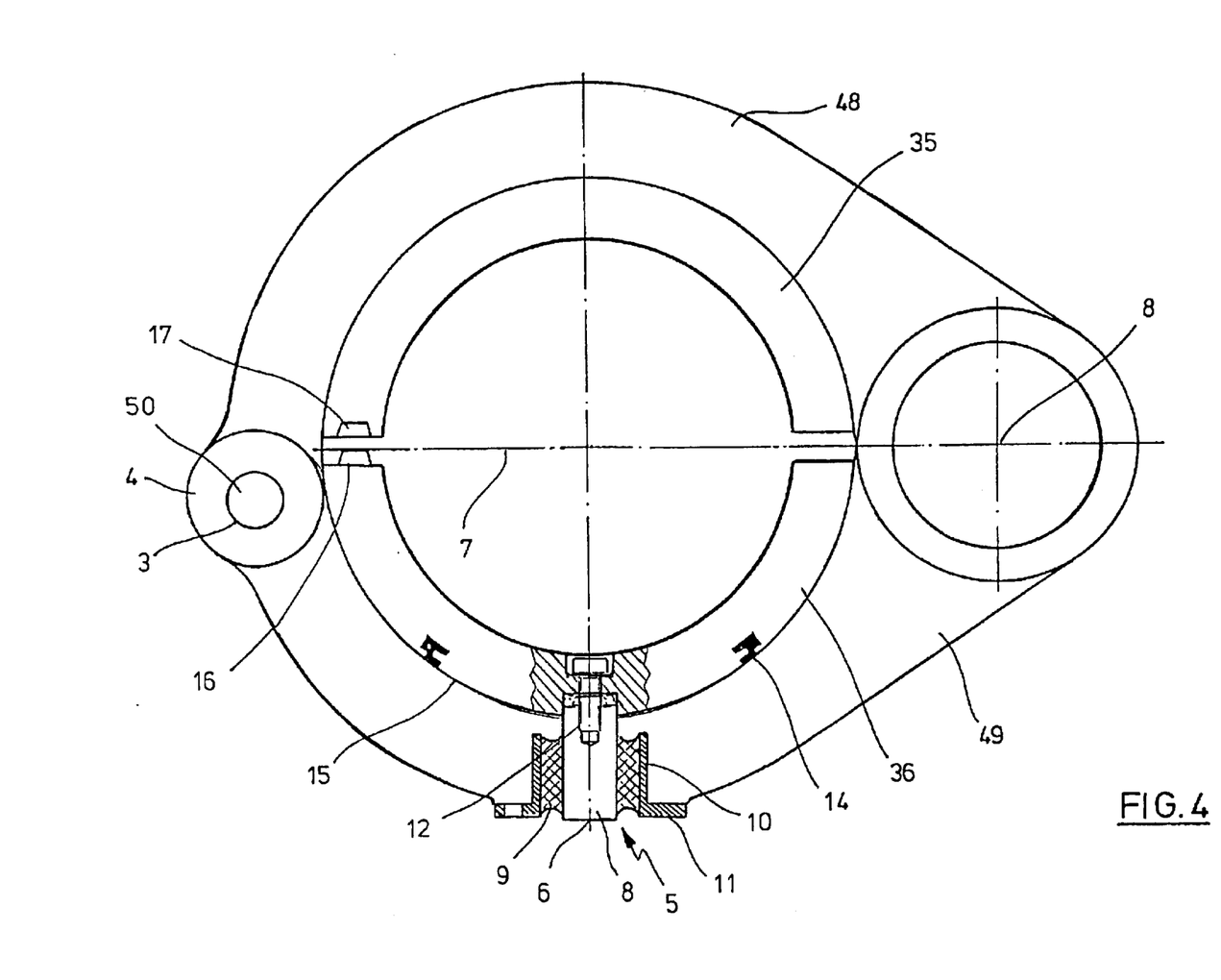
FIG. 4 is a horizontal cross-section through a blow station with two supports arranged to pivot relative to one another, and a blow mould segment that slides relative to its support all in accordance with the present invention.

It can be seen from the horizontal cross-section view in FIG. 4 that the supports (48, 49) are arranged to pivot relative to an axis of rotation (2). The locking device (50) is located in the vicinity of the edges of the support (48, 49) facing away from the axis of rotation (2), and can consist of a locking pin (3) that is carried in locking sleeves (4). In particular, the intent is for the supports (48, 49) to be equipped alternatingly with locking sleeves (4) in such a way that, when the locking pin (3) is moved, the supports (48, 49) are either locked or released relative to one another, depending on the position at the time.

It can also be seen from FIG. 4 that the mould part (36) is held relative to the associated support (49) by a guide element (5). The guide element (5) permits the mould part (36) to slide relative to the support (49) toward a preloading axis 6. In particular, the intent is to position the preloading axis (6) essentially perpendicular to a parting surface (7).

The guide element (5) consists essentially of a hard core (8) that is embedded in an elastomer (9). In the embodiment shown in FIG. 4, the elastomer (9) is surrounded by a sleeve (10) whose position toward the preloading axis (6) is predetermined by an outer flange (11) relative to the support (49). In particular, the intent is to arrange the sleeve (10) concentric to the preloading axis (6), and the elastomer (9) likewise annularly relative to the preloading axis (6). The mould part (36) is connected to the core (8) by a threaded fastener (12).

On account of the core (8) being embedded in the elastomer (9), it is possible to accomplish relative motion of the core (8) with respect to the support (49) toward the preloading axis (6). Once an appropriate regulating force stops being applied to the mould part (36), the inherent elasticity of the elastomer (9) generates a restoring force, which can be supported if necessary by additional spring forces from separate spring elements or by an active restoring force opposing the regulating force.

For the application of preloading forces, the particular intent is to arrange a seal (14) between the mould part (36) and the support (49); this seal encloses an area of pressure action (15). A pneumatic overpressure can be directed toward the area of pressure action (15), which generates the action of force as a function of the exposed area of action.

In addition, the combination of the elastomer (9) and the core (8) makes it possible to make positioning movements transverse or diagonal to the preloading axis (6). Such movements can be necessary on account of manufacturing tolerances, if alignment elements (16, 17), which can take the form of appropriate prismatic stones for example, engage in one another when the mould parts (35, 36) are brought together and accomplish exact alignment of the mould parts (35, 36) relative to one another.

Figure 5:
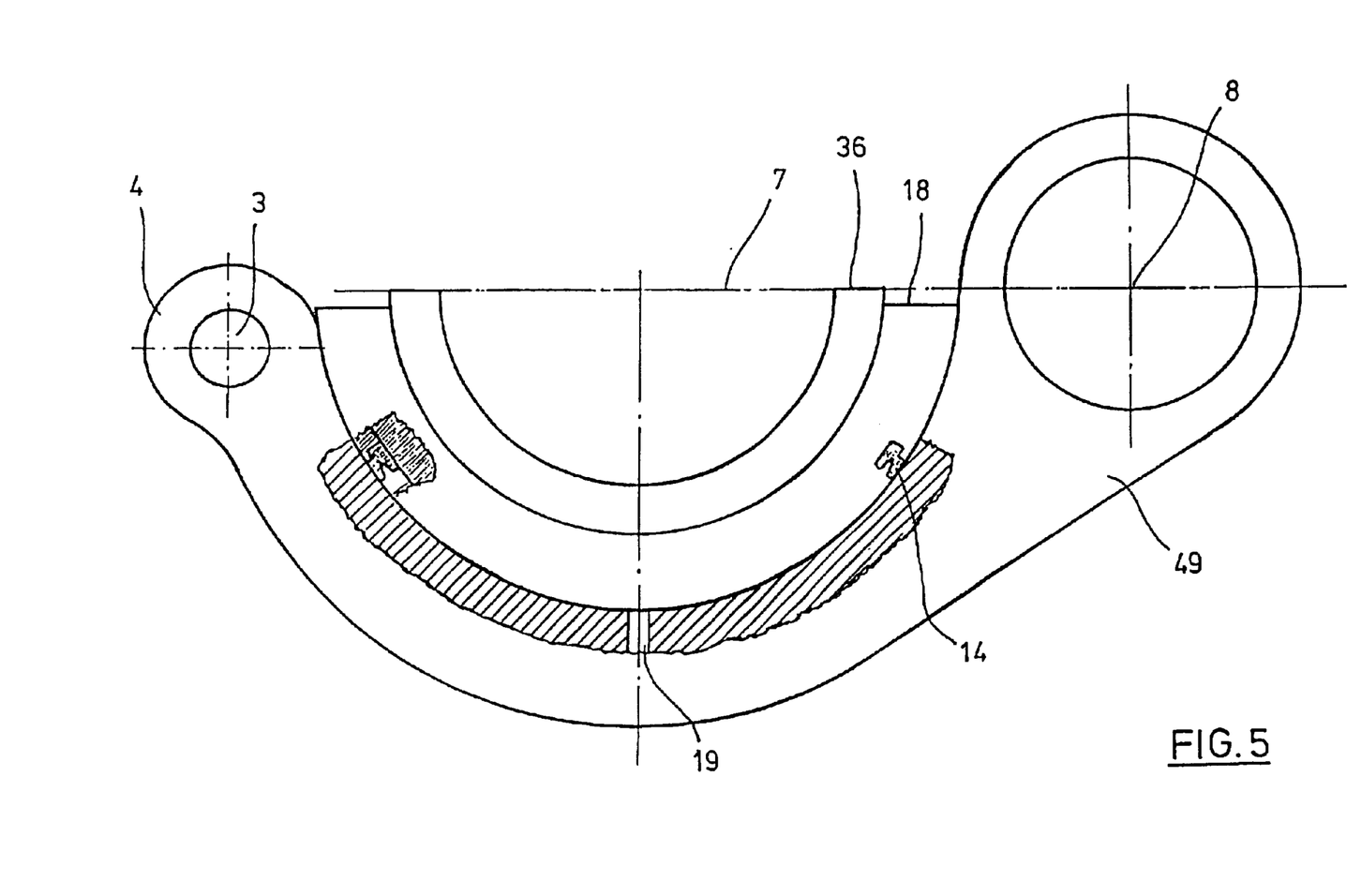
FIG. 5 is a fragmentary view similar to that of FIG. 4 but showing a modified embodiment, using an outer shell between the mould supports and the blow mould segments in accordance with the present invention.

FIG. 5 shows an embodiment in which intermediate shells (18) are arranged between the mould parts (35, 36) and the supports (48, 49). In this case, the intermediate shells (18) hold the mould parts (35, 36), for example with the aid of quick-release fasteners. In this embodiment, the seal (14) is located in the vicinity of a back of the intermediate shell (18) facing the supports (49). Guidance and mounting of the intermediate shell (18) relative to the support (49), in turn, can be accomplished by the guide elements (5) with core (8) and elastomer (9) shown in FIG. 4.

Supply of the pressurized gas to the area of pressure action (15), which is encompassed by the seal (14), is accomplished by a pressure feed line (19). After appropriate pneumatic switching operations have been performed, the pressurized gas can be bled off again through the pressure feed line (19).

Figure 6:
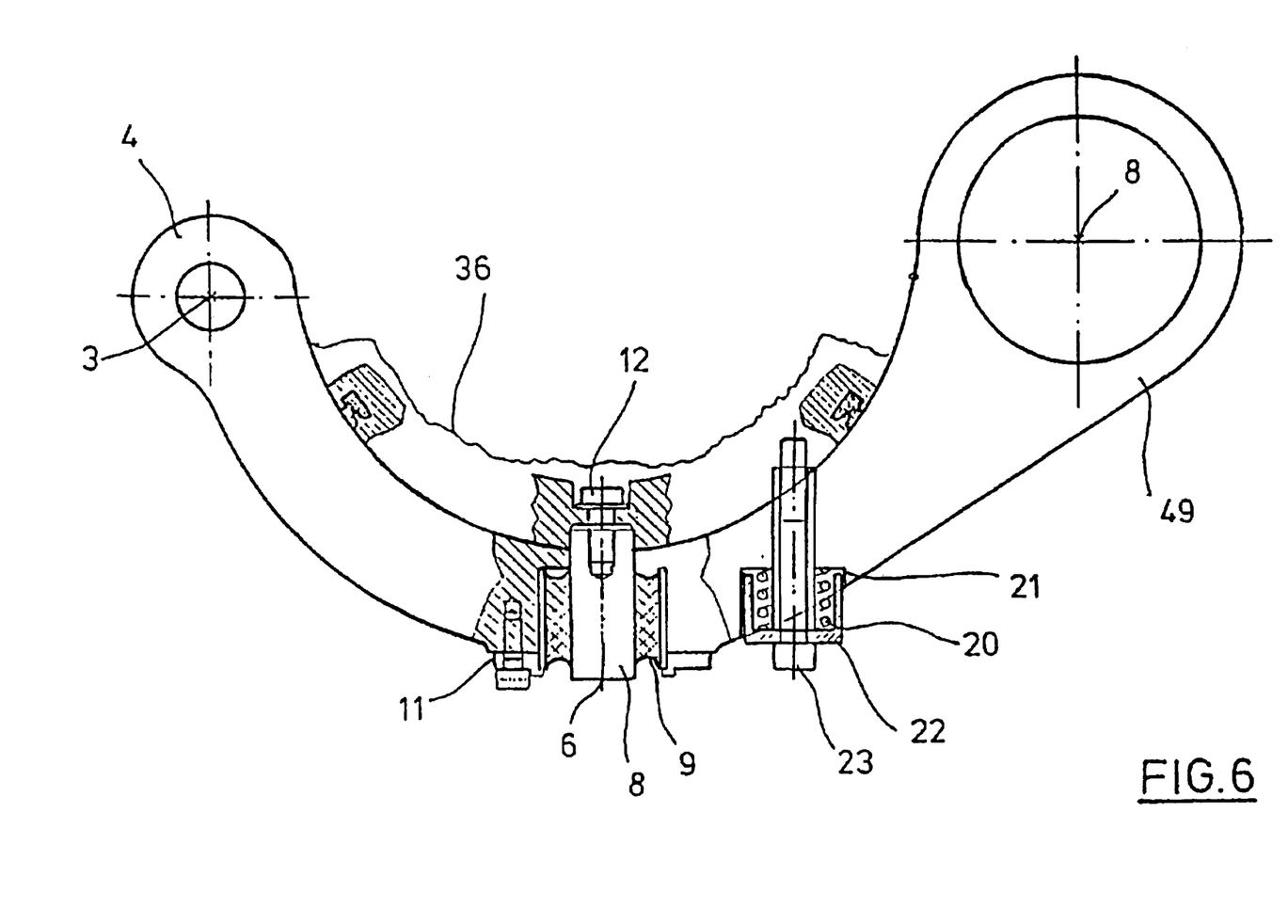
FIG. 6 is another cross-section view similar to that of FIG. 5 but illustrating the installation position of the mounting elements in the area of the mould supports in accordance with the present invention.

FIG. 6 shows an embodiment in which a spring element (20) supports restoration of the mould part (36) after application of the preloading force has stopped. The spring element (20) can take the form of a coil spring that is arranged in a depression (21) in the support (49), and acts upon a connecting pin (23) either directly or through an interposed clamping sleeve (22); said connecting pin is screwed into the mould part (36) or an intermediate shell (18) and extends through the support (49).

Figure 7:
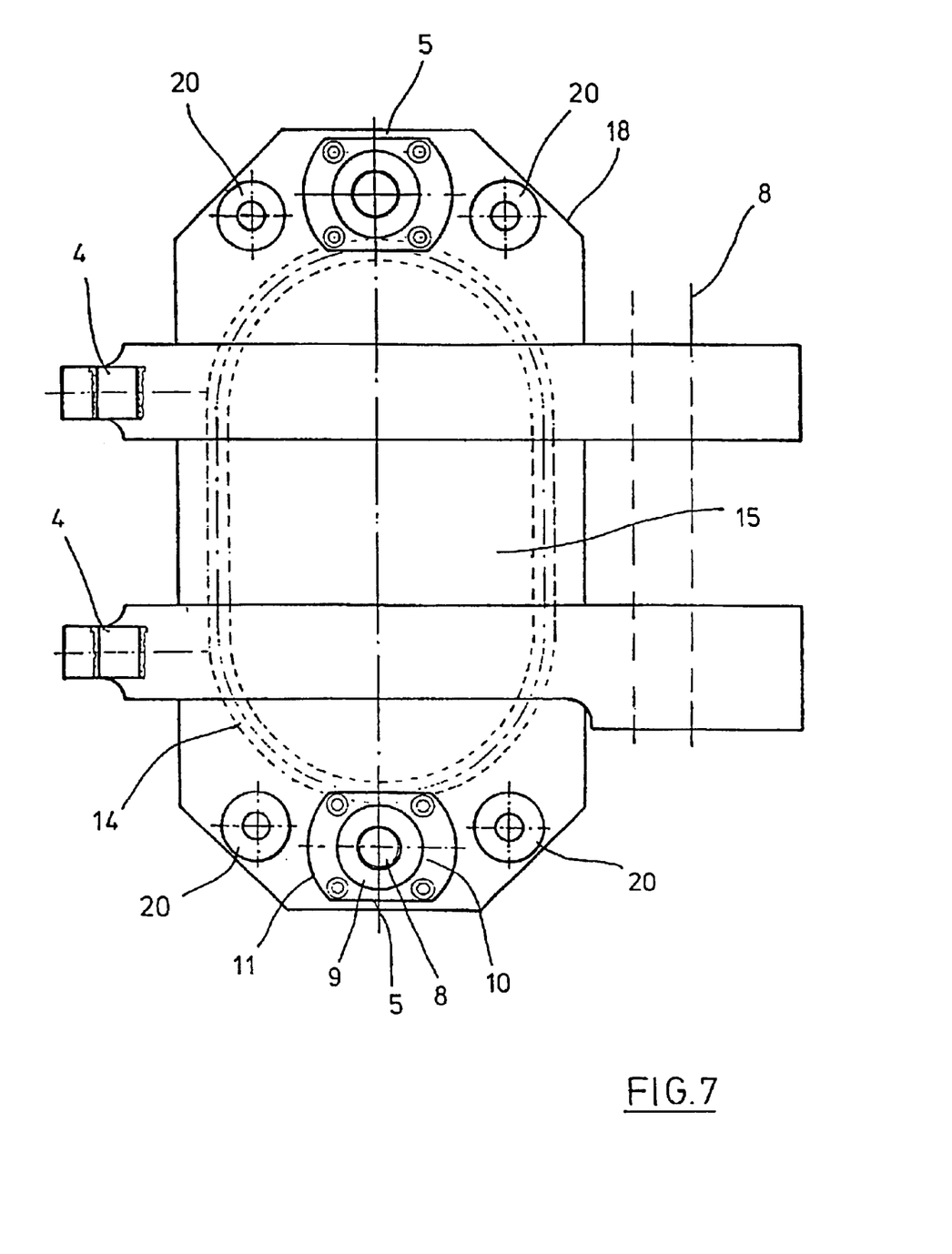
FIG. 7 is a side view of the blow station.

FIG. 7 shows the spatial arrangement of two guide elements (5), four spring elements (20) and the seal (14) relative to one another when an intermediate shell (18) is used. It is evident that a symmetrical arrangement of the components relative to a center line has been realized. In particular, the spring elements (20) and the guide elements (5) are arranged outside of the area of pressure action, as well.

Figure 8:
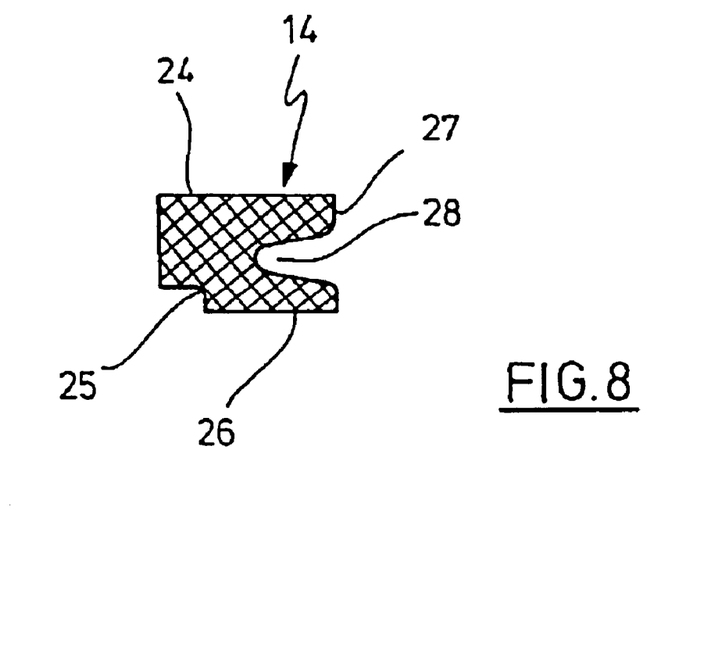
FIG. 8 is an enlarged cross-sectional view of a seal in accordance with the present invention.

FIG. 8 shows an enlarged cross-section of the cross-sectional profile of the seal (14). It is evident, in particular, that the seal (14) has a base block (24) that can be inserted in the mould part (36) or the intermediate shell (18) and is held thereby. The base block (24) transitions through a tapered part (25) to a seal lip (26). The seal lip (26) delimits, across from a base projection (27) of the base block (24), a U-shaped or V-shaped seal notch (28).

Figure 9:
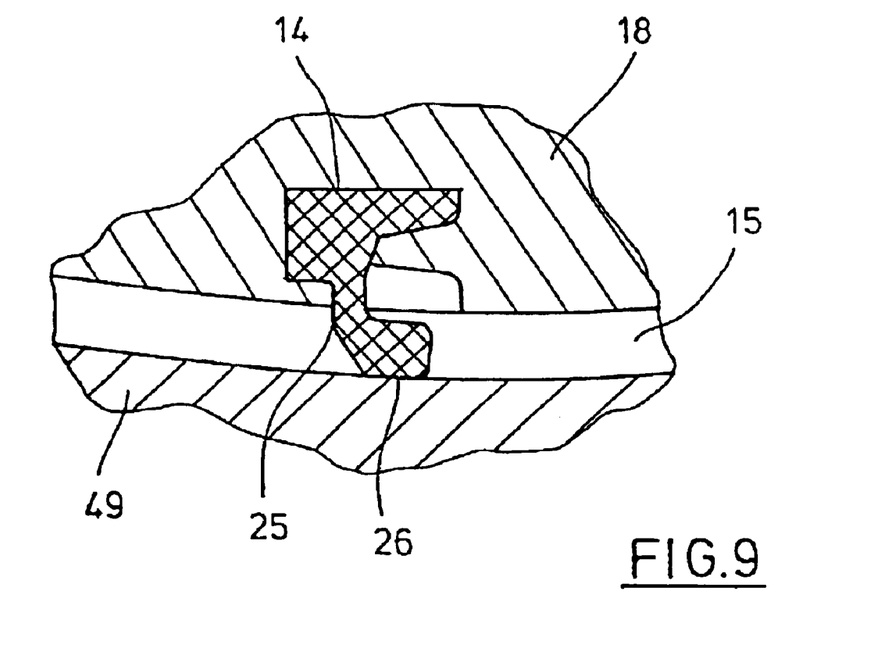
FIG. 9 is a view of the seal of FIG. 8 during the application of a pressure medium in accordance with the present invention.

FIG. 9 shows the seal (14) during the application of pressure on the pressure action area (15). Here, a space occurring between the support (48) and the mould part (36) or the intermediate shell (18) is shown enlarged as compared to real conditions in order to illustrate the deformation of the seal (14). It is evident, in particular, that a deformation in the vicinity of the tapered part (25) occurs in such a way that the seal lip (26) makes large area contact with the support (48). Extremely good sealing action is achieved in this way. The deformation takes place as a result of the application of pressure in the pressure action area (15). After the application of pressure is stopped, the seal (14) returns to its original shape as a result of the restoring forces inherent in the material.

What is claimed is:

1. A device for blow moulding containers of a thermoplastic material that has at least one blow station with at least one blow mould that is comprised of at least two blow mould segments held by supports and wherein at least one of the blow mould segments is arranged such that it can move relative to its support, characterized in that the support (48, 49) is equipped with at least two guide elements (5) for the movable blow mould segment and in that the guide element (5) has a hard core (8) that is connected to the blow mould segment and that is embedded, at least in part, in an elastomer (9) that is carried by the support (48, 49).

2. A device in accordance with claim 1, characterized in that sections of the core (8) protrude out of the elastomer (9).

3. A device in accordance with claim 1 characterized in that the core (8) is connected to the blow mould segment by a coupling element.

4. A device in accordance with claim 1 characterized in that the combination of the core (8) and the elastomer (9) is designed in the form of a sleeve.

5. A device in accordance with claim 1 characterized in that the elastomer (9) surrounds the core (8).

6. A device in accordance with claim 1 characterized in that the core (8) is directly connected to one mould part (35, 36).

7. A device in accordance with claim 1 characterized in that the core (8) is connected to an intermediate shell (18) that supports the mould part (35, 36).

8. A device in accordance with claim 1 characterized in that the supports (48, 49) are hinge-jointed to one another.

9. A device in accordance with claim 1 characterized in that provision is made for the application of pressure to determine positioning of the movable blow mould segment.

10. A device in accordance with claim 1 characterized in that one of the mould parts (35, 36) can be pneumatically braced with respect to the other mould part (35, 36).

11. A device in accordance with claim 1 characterized in that at least one of the mould parts (35, 36) is held in place so as to be sealed with respect to the support (48, 49).

12. A device in accordance with claim 1 characterized in that, in order to provide a preloading force, provision is made for an area of pressure action (15) that is delimited by a circumferential seal (14).

13. A device in accordance with claim 1 characterized in that the guide elements (5) are arranged outside the area of pressure action.

14. A device for blow moulding containers of a thermoplastic material that has at least one blow station with at least one blow mould hat is comprised of at least two blow mould segments held by supports and wherein at least one of the blow mould segments is arranged such that it can move relative to its support, characterized in that the blow mould segment is sealed by a circumferential elastomer seal (14) with respect to the support (48, 49) in an area of action provided for the application of pneumatic pressure, and in that the seal (14) has a seal lip (26) that makes area contact with the support (48, 49) when pressure is applied.

15. A device in accordance with claim 14, characterized in that the seal lip (26) has a base block (24) that is connected by a tapered part (25) to a seal lip (26), sections of which extend a distance from a base projection (27) of the base block (24) and, in combination with the base projection (27), delimits a seal notch (28).

16. A device in accordance with claim 14, characterized in that the seal notch (28) is arranged to face an area of pressure action (15).

17. A device in accordance with claim 15, characterized in that the seal notch (28) is arranged to face an area of pressure action (15).

18. A device in accordance with claim 7 characterized in that provision is made for the application of pressure to determine positioning of the movable blow mould segment.

19. A device in accordance with claim 8 characterized in that provision is made for the application of pressure to determine positioning of the movable blow mould segment.

20. A device for blow moulding containers of a thermoplastic material that has at least one blow station with at least one blow mould that is comprised of at least two blow mould segments held by supports and wherein at least one of the blow mould segments is arranged such that it can move relative to its support, characterized in that the support (48, 49) is equipped with at least two guide elements (5) for the movable blow mould segment and in that the guide element (5) has a hard core (8) that is connected to the blow mould segment and that is embedded, at least in part, in an elastomer (9) that is carried by the support (48, 49) and the blow mould segment is sealed by a circumferential elastomer seal (14) with respect to the support (48, 49) in an area of action provided for the application of pneumatic pressure, and in that the seal (14) has a seal lip (26) that makes area contact with the support (48, 49) when pressure is applied.

* * * * *